Patented July 7, 1931

1,813,607

UNITED STATES PATENT OFFICE

MARTIN BOLLMANN, OF BERLIN, GERMANY, ASSIGNOR TO WINTHROP CHEMICAL COMPANY, INC., OF NEW YORK, N. Y., A CORPORATION OF NEW YORK

1-METHYL-4-HYDROXYBENZENE CAPRYLATE

No Drawing. Application filed March 19, 1929, Serial No. 348,366, and in Germany March 30, 1928.

The present invention relates to a new compound, the 1-methyl-4-hydroxybenzene-caprylate

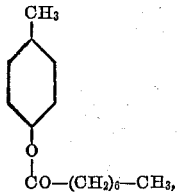

a colorless liquid of the density $D_{15° C.}=0.965$ and of the boiling point of 170–172° C. at 6 mm. pressure. It dissolves at 20° C. in 16 parts of ethanol of 80 per cent. strength by volume.

The said new compound may be obtained by esterifying in a known manner 1-methyl-4-hydroxybenzene with caprylic acid.

The 1-methyl-4-hydroxybenzenecaprylate possesses a characteristic smell, which particularly is adapted for making up perfumes the odor of which resemble the odor of jasmine or narcissus flowers.

*Example 1.*—Equimolecular proportions of 1-methyl-4-hydroxybenzene and caprylic acid are heated during some hours at about 100° C. while adding drop by drop phosphorus oxychloride. The reaction mass, after cooling, is poured on ice, washed first with a weak solution of sodium hydroxide and then carefully with water and finally distilled in a vacuum.

*Example 2.*— Mixture of a jasmine-like smell for soaps:

10 parts by weight of benzyl acetate.
5 parts by weight of terpineol.
2 parts by weight of cumarine.
1 part by weight of linalool.
0.5 part by weight of 1-methyl-4-hydroxybenzenecaprylate.

*Example 3.*— Mixture of a jasmine-like smell:

5 parts by weight of benzyl acetate.
9 parts by weight of isoeugenol.
4 parts by weight of terpineol.
2 parts by weight of linalool.
3 parts by weight of geraniol.
0.5 part by weight of ylang-ylang oil.
0.6 part by weight of α-amyl-cinnamic aldehyde.
0.75 part by weight of 1-methyl-4-hydroxybenzenecaprylate.

I claim:—

1. As a new product 1-methyl-4-hydroxybenzene caprylate corresponding to the formula:

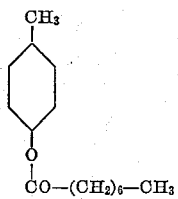

being a colorless liquid with a boiling point of 170 to 172° C. at 6 mm. pressure and a density $D_{15° C.}=0.965$ and being miscible with other odoriferous substances for the manufacture of perfumes.

In testimony whereof, I affix my signature.

MARTIN BOLLMANN.